(12) United States Patent
Ruane et al.

(10) Patent No.: US 11,436,884 B2
(45) Date of Patent: Sep. 6, 2022

(54) SYSTEM AND METHOD FOR HANDLING CONTAINERS

(71) Applicant: Chemco Ireland Limited, Dublin (IE)

(72) Inventors: Edward Ruane, Dublin (IE); Desmond McDonald, Dublin (IE)

(73) Assignee: Chemco Ireland Limited, Dublin (IE)

( * ) Notice: Subject to any disclaimer, the term of this patent is extended or adjusted under 35 U.S.C. 154(b) by 0 days.

(21) Appl. No.: 17/264,073

(22) PCT Filed: Jul. 31, 2019

(86) PCT No.: PCT/EP2019/070714
§ 371 (c)(1),
(2) Date: Jan. 28, 2021

(87) PCT Pub. No.: WO2020/030512
PCT Pub. Date: Feb. 13, 2020

(65) Prior Publication Data
US 2021/0241556 A1  Aug. 5, 2021

(30) Foreign Application Priority Data

Aug. 8, 2018 (IE) .................................... 2018/0229

(51) Int. Cl.
G07C 9/00 (2020.01)
B01L 1/00 (2006.01)
G07F 17/12 (2006.01)

(52) U.S. Cl.
CPC ............ *G07C 9/00896* (2013.01); *B01L 1/50* (2013.01); *G07C 9/00182* (2013.01);
(Continued)

(58) Field of Classification Search
CPC ...................................................... G07C 9/00
See application file for complete search history.

(56) References Cited

U.S. PATENT DOCUMENTS

| 3,465,724 A | 9/1969 | Broadbent |
| 5,205,436 A | 4/1993 | Savage |
(Continued)

FOREIGN PATENT DOCUMENTS

| CN | 104268803 A | 1/2015 |
| CN | 206075339 U | 4/2017 |
(Continued)

OTHER PUBLICATIONS

Search Report and Written Opinion from Irish Application No. 2018/0229 dated Nov. 27, 2018 (3 pages).
(Continued)

*Primary Examiner* — K. Wong
(74) *Attorney, Agent, or Firm* — SmithAmundsen LLC

(57) ABSTRACT

A system (1) for handling containers (7) having electronic product ID tags (15), the system comprises a storage cabinet (5) with lockable compartments (51) for storing tool kits (53) for handling the containers; each tool kit has an electronic ID tag associated with a predetermined compartment (51) in the storage cabinet and with a predetermined product ID tag of a container; access to each compartment is allowed or blocked by a respective electronically controlled lock; an electronic control unit (21); an electronic ID reader device (25) in communication with the electronic control unit, operable to read electronic ID tags of the components of the system and communicate same to the electronic control unit; the electronic control unit is operable to actuate the electronic lock of a predetermined compartment in the storage cabinet to allow access to said compartment upon matching the electronic product ID tag of a container with the associated electronic ID tag of the tool kit stored in the predetermined compartment, whilst keeping the remaining compartments locked.

11 Claims, 1 Drawing Sheet

(52) U.S. Cl.
CPC .......... *G07F 17/12* (2013.01); *B01L 2200/14* (2013.01); *B01L 2300/022* (2013.01); *G07C 2009/0092* (2013.01)

(56) References Cited

U.S. PATENT DOCUMENTS

| | | | | |
|---|---|---|---|---|
| 6,587,748 | B2* | 7/2003 | Baack | G07F 11/54 |
| | | | | 221/9 |
| 7,086,558 | B1* | 8/2006 | Pixley | G07F 11/62 |
| | | | | 221/241 |
| 7,123,989 | B2* | 10/2006 | Pinney | G07F 9/002 |
| | | | | 700/216 |
| 7,557,709 | B2* | 7/2009 | Flores | G06Q 10/087 |
| | | | | 340/10.33 |
| 7,568,627 | B2* | 8/2009 | Lunak | B65G 1/127 |
| | | | | 235/383 |
| 8,170,714 | B2* | 5/2012 | Spano, Jr. | G16H 40/67 |
| | | | | 700/232 |
| 8,538,581 | B2* | 9/2013 | Kuehnrich | G07F 17/005 |
| | | | | 700/232 |
| 8,571,701 | B2* | 10/2013 | Lunak | G06Q 10/087 |
| | | | | 700/216 |
| 9,135,767 | B2* | 9/2015 | Kropp | G07F 7/005 |
| 10,013,834 | B2* | 7/2018 | Phillips | G06V 10/40 |
| 2008/0111691 | A1 | 5/2008 | Lee et al. | |

FOREIGN PATENT DOCUMENTS

| | | |
|---|---|---|
| CN | 107478005 A | 12/2017 |
| CN | 107492164 A | 12/2017 |
| CN | 107898162 A | 4/2018 |
| CN | 207424942 U | 5/2018 |
| DE | 202011004171 | 6/2011 |
| EP | 2093726 | 8/2009 |
| JP | 2008114955 A | 5/2008 |
| WO | 2009/148388 | 12/2009 |
| WO | 2014/125243 | 8/2014 |

OTHER PUBLICATIONS

PCT/EP2019/070714 International Search Report and Written Opinion of the International Searching Authority dated Nov. 8, 2019 (14 pages).

First Office Action from the State Intellectual Property Office of China for Application No. 201980050002.2 dated Jun. 17, 2022 (12 pages, which includes a English Summary of Examination).

* cited by examiner

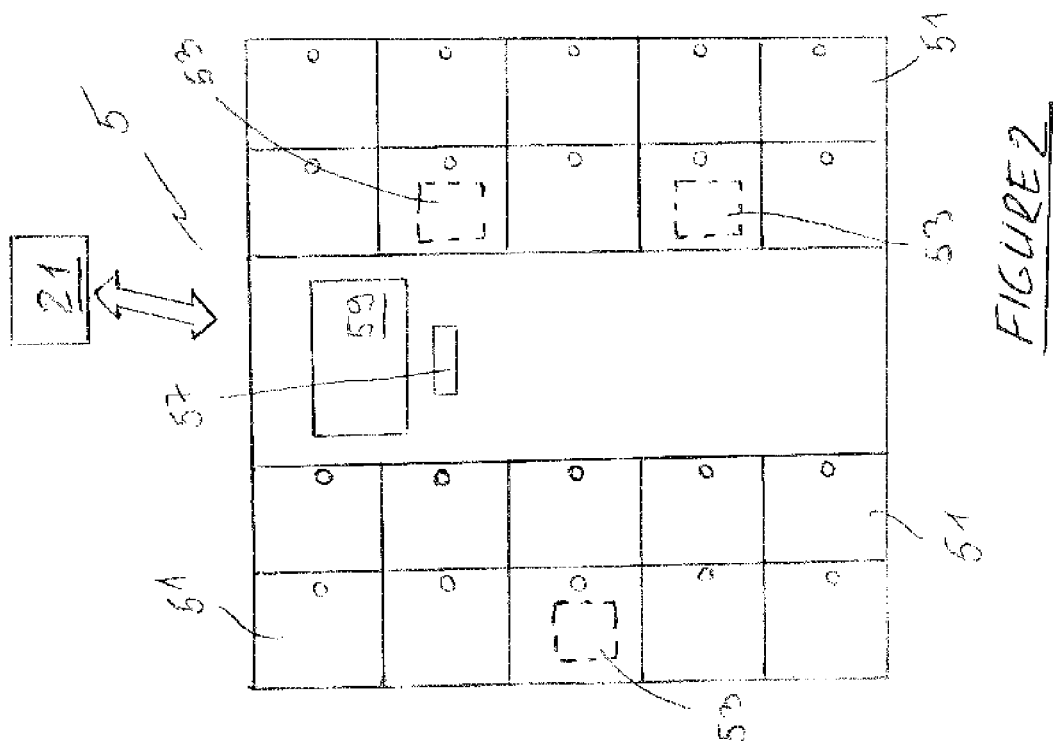
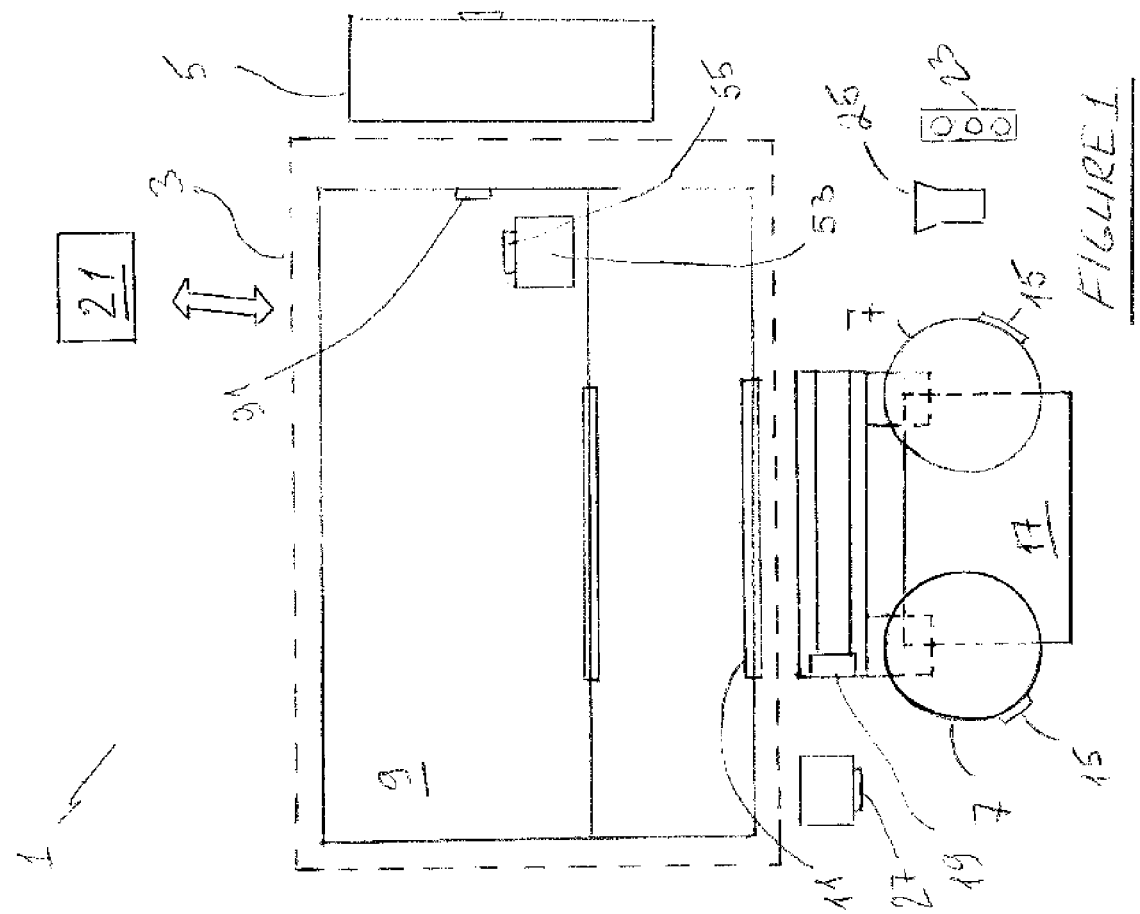

SYSTEM AND METHOD FOR HANDLING CONTAINERS

CROSS REFERENCE TO RELATED APPLICATIONS

This application is a nationalization of and claims priority to PCT/EP2019/070714, filed on Jul. 31, 2019, which claims priority to IE2018/0229, filed on Aug. 8, 2018, the disclosures of each of which are hereby incorporated by reference in their entirety.

FIELD OF THE INVENTION

The present invention relates to a system and method for handling containers, such as, for example, but not limited thereto, bulk containers for storing, transporting and dispensing chemicals.

BACKGROUND TO THE INVENTION

In some industries, liquid substances, such as chemicals or food, are stored, transported and distributed in bulk containers. To dispense the substance from the containers, dip tubes are employed. A dip tube extends from the lid of the container into the container and the substance is drawn from the container by an external pump. Once the container has been emptied or partially emptied, the dip tube is removed from the container and re-used by inserting it into a full or partially full container. Sometimes it is necessary to remove the dip tube from a full or partially full container and insert it into another full or partially full container. These steps are known as dip tube exchange. Such an exchange typically takes place in a clean room or clean room environment. During the dip tube exchange, special tooling is employed, such as chemical key code check gauges, wrench adapters, plugs etc. The problem associated with the existing dip tube exchange process is the risk of cross-contamination if the same tooling is used to manipulate containers with different substances.

In view of the above, it is an object of the present invention to alleviate and mitigate the above disadvantages.

SUMMARY OF THE INVENTION

Accordingly, in a first aspect the present invention provides a system for handling containers having electronic product ID tags, the system comprising
  at least one container handling station;
  a storage cabinet with a plurality of lockable compartments for storing tool kits for use within the container handling station for handling said containers; each tool kit having its own electronic ID tag associated with a predetermined compartment in the storage cabinet and with a predetermined product ID tag of a container; wherein access to each compartment is allowed or blocked by a respective electronically controlled lock;
  an electronic control unit in communication with the locks, the electronic control unit being operable to control the actuation of the locks and the electronic control unit storing information on the associated electronic ID tags of the tool kits, the predetermined compartments in the cabinet and the product ID tags of containers;
  an electronic ID reader device in communication with the electronic control unit, the electronic ID reader device being operable to read electronic ID tags of the components of the system and communicate same to the electronic control unit;
  wherein the electronic control unit is operable to actuate the electronic lock of a predetermined compartment in the storage cabinet to allow access to said compartment upon matching the electronic product ID tag of a container communicated to the electronic control unit by the electronic ID reader device through the system with the associated electronic ID tag of the tool kit stored in the predetermined compartment, whilst keeping the remaining compartments locked.

Preferably, the storage cabinet has an electronic ID tag associated with said predetermined product ID tag of the container, wherein the electronic control unit is additionally operable to actuate the electronic lock of said predetermined compartment in the storage cabinet upon matching the previously communicated product ID tag of the container with the electronic ID tag of the cabinet communicated to the electronic control unit by the electronic ID reader device.

Preferably, the container handling station has a processing zone with an entrance for containers and an electronically controlled barrier operable to allow or block access to the processing zone via the entrance;
  the electronic control unit being in communication with the barrier and operable to control the actuation of the barrier; and
  the electronic control unit being operable to actuate the barrier to allow the container to access the processing zone once the electronic product ID tag of the container and the electronic ID tag of the tool kit retrieved from the storage cabinet have been read and communicated by the reader device to the electronic control unit and matched within the electronic control unit.

Preferably, the electronic control unit is additionally operable to actuate the barrier to allow the container to access the processing zone after the tool kit has been retrieved from the predetermined compartment, transferred to the processing zone and an electronic location ID tag in the processing zone and the electronic ID tag of the tool kit have been read by the reader device and communicated to the electronic control unit and matched within the electronic control unit.

Preferably, the system has a plurality of said container handling stations, each container handling station having its own electronic ID tag, the electronic ID tag of each container handling station being associated with a predetermined electronic product ID tag of a container; and the electronic control unit is operable to store information on the associated electronic ID tags of the container handling stations and the electronic product ID tags of container; wherein the electronic control unit is additionally operable to permit a predetermined compartment in the storage cabinet to open once the electronic ID tag of the container handling station to be accessed and the electronic product ID tag of container to be handled within that station have been read and communicated by the reader device to the electronic control unit and matched within the electronic control unit.

One or more containers with the same product ID can access the processing zone simultaneously and be processed at the same time in the processing zone using the same tool kit. Furthermore, once the correct tool kit has been retrieved, multiple batches of containers with the same product ID can be processed in the processing zone using the same tool kit.

In one arrangement, the electronic control unit is additionally operable to allow the reader device to read the electronic product ID tag of a container once an operator ID has been communicated by the reader device to the electronic control unit and matched with access privilege data within the electronic control unit. The operator ID may be a unique access code entered by the operator into the reader device.

The electronic ID reader device may be an RF scanner. The electronic ID tag of each container handling station, electronic ID tags of the tool kits, predetermined product ID tag of a container, the electronic ID tag of the storage cabinet and the electronic location ID tag in the processing zone may be barcode tags.

Pedestrian access to the processing zone may be allowed at all times.

The handling of containers in the processing zone may comprise dip tube exchange. The dip tube exchange may comprise removing a dip tube from an empty or partially empty container and inserting it into a full or partially full container. The dip tube exchange may also comprise removing a dip tube from a full or partially full container and inserting it into another full or partially full container.

The electronic control unit may comprise a programmable logic controller (PLC) or one or more computer control devices.

The containers may be bulk containers for storing, transporting and dispensing chemicals, but the invention is not limited to this particular type of containers.

The processing zone is preferably a controlled environment zone and may be a clean room.

The tool kit may include one or more of, but not limited thereto, chemical key code check gauges, wrench adapters, plugs etc.

The electronic control unit is configured to lock down the operation of the system if a mismatch between the electronic ID tags is detected by the electronic control unit.

In a second aspect, the present invention provides a method for handling containers having electronic product ID tags, the method comprising the steps of:
a) providing:
  at least one container handling station;
  a storage cabinet with a plurality of lockable compartments for storing tool kits for use within the container handling station for handling said containers; each tool kit having its own electronic ID tag associated with a predetermined compartment in the storage cabinet and with a predetermined product ID tag of a container; wherein access to each compartment is allowed or blocked by a respective electronically controlled lock;
  an electronic control unit in communication with the locks, the electronic control unit being operable to control the actuation of the locks and the electronic control unit storing information on the associated electronic ID tags of the tool kits, the predetermined compartments in the cabinet and the product ID tags of containers;
  an electronic ID reader device in communication with the electronic control unit, the electronic ID reader device being operable to read electronic ID tags of the components of the system and communicate same to the electronic control unit;
b) reading, by means of the electronic ID reader device, the electronic product ID tag of a container and communicating read data to the electronic control unit; and
c) actuating, by means of the electronic control unit, the electronic lock of a predetermined compartment in the storage cabinet to allow access to said compartment upon matching the electronic product ID tag of a container communicated to the electronic control unit by the electronic ID reader device with the associated electronic ID tag of the tool kit stored in the predetermined compartment, whilst keeping the remaining compartments locked.

Preferably, the storage cabinet has an electronic ID tag associated with said predetermined product ID tag of the container, wherein the method includes the step of matching, by means of the electronic control unit, the previously communicated product ID tag of the container with the electronic ID tag of the cabinet communicated to the electronic control unit by the electronic ID reader device prior to allowing the actuation of the electronic lock of said predetermined compartment in the storage cabinet.

Preferably, the container handling station has a processing zone with an entrance for containers and an electronically controlled barrier operable to allow or block access to the processing zone via the entrance;
  the electronic control unit being in communication with the barrier and operable to control the actuation of the barrier; and the method includes the step of
  reading and communicating, by means of the reader device, to the electronic control unit the electronic product ID tag of the container and the electronic ID tag of the tool kit retrieved from the storage cabinet;
  matching the electronic product ID tag of the container and the electronic ID tag of the tool kit within the electronic control unit; and
  actuating, by means of the electronic control unit, the barrier to allow the container to access the processing zone.

Preferably, prior to actuating the barrier, the method comprises the step of retrieving the tool kit from the predetermined compartment, transferring to the processing zone and reading by the reader device an electronic location ID tag in the processing zone and the electronic ID tag of the tool kit and communicating same to the electronic control unit and matching same within the electronic control unit.

Preferably, the system has a plurality of said container handling stations, each container handling station having its own electronic ID tag, the electronic ID tag of each container handling station being associated with a predetermined electronic product ID tag of a container; and the electronic control unit is operable to store information on the associated electronic ID tags of the container handling stations and the electronic product ID tags of container; wherein the method comprises the step of prior to permitting the predetermined compartment in the storage cabinet to open, reading by the reader device the electronic ID tag of the container handling station to be accessed and the electronic product ID tag of container to be handled within that station and communicating same to the electronic control unit and matching same within the electronic control unit.

The system and method of the present invention provide automated control, through mechanical and software workflow control system, of the introduction of containers, tool kits and human operator into a controlled environment to perform container handling operations in the controlled environment. The system and method allow one dedicated tool kit to access the controlled environment while locking out the remaining tool kits and ensure that the same tool kit is used for handling the same product kits thus minimising the risk cross contamination. The system and method ensure that only the correct container is allowed to access to the container handling station. This also reduces the risk of cross contamination. If a breach is identified during operation, the entire system enters a lockdown mode. An investigation by an engineer or manager is required to return the station to operation.

It will be appreciated that features of the first aspect of the invention can be incorporated into the second aspect and vice versa.

DETAILED DESCRIPTION OF THE INVENTION

The invention will now be described with reference to the accompanying drawings which show, by way of example only, embodiments of the invention. In the drawings:

FIG. 1 is a schematic plan view of the system of the invention; and

FIG. 2 is a schematic front view of a storage cabinet of the system of FIG. 1.

Referring to FIGS. 1 and 2, a system 1 and method for handling containers 7 in accordance with the present invention will be jointly described. The system 1 includes at least one and typically a plurality of container handling stations 3 (only one station 3 is shown in the drawings) and a storage cabinet 5 nearby the station 3. The storage cabinet 5 has a plurality of lockable compartments 51 for storing tool kits 53 for use within the station 3 for handling said containers 7.

An electronic control unit 21, which may include a programmable logic controller (PLC) or one or more computer control devices (not shown in the drawings), is arranged in communication with the components of the system 1 to control the operation of the system 1 as will be described below. A number of components of the system 1, as will be described below are equipped with electronic ID tags readable by an electronic ID reader device 25. The electronic ID tags may be provided as barcodes and the reader device 25 may be an RF reader, but the invention is not limited to this particular arrangement. The reader device 25 is arranged in communication with the electronic control unit 21 and is operable to read the electronic ID tags of the components of the system 1 and communicate same to the electronic control unit 21.

The containers 7 may be bulk containers for storing, transporting and dispensing chemicals, but the invention is not limited to a particular type of container. Each container 7 has an electronic product ID tag 15 usually indicating the product stored or to be received in the container 7. The tool kits 53 may include one or more of, but not limited thereto, chemical key code check gauges, wrench adapters, plugs etc.

The container handling station 3 has a processing zone 9 with an entrance 11 for containers 7 and an electronically controlled barrier 19 operable to allow or block access for the containers 7 to the processing zone 9 via the entrance 11. Containers 7 are typically transported on a pallet 17. Pedestrian access, e.g. for an operator, to the processing zone 9 is normally allowed at all times. The processing zone 9 is typically a controlled environment zone, such as, for example, a clean room. The handling of containers in the processing zone 9 may comprise dip tube exchange. The dip tube exchange typically involves removing a dip tube (not shown in the drawings) from an empty or partially empty container 7 and inserting it into a full or partially full container 7. The dip tube exchange may also involve removing a dip tube from a full or partially full container 7 and inserting it into another full or partially full container 7.

Each station 3 is equipped with an automated traffic light 23 controlled by the electronic control unit 21 to indicate the status of the station 3. Amber light indicates the station 3 is ready for product configuration, i.e. to be set up for handling containers with a specific product. Green light indicates the station 3 is configured for a specific product and is operational and access is restricted to containers 7 with a specific product only. Red light indicates a lockdown status, i.e. the process flow has been breached or a maintenance has been scheduled. The traffic light 23 is electronically linked to the barrier 19 which controls access to the processing zone 9.

Initially, the containers 7 are delivered to the station 3 on a pallet 17 by an operator (not shown in the drawings) and positioned in front of the barrier 19. Typically, full containers 7 are positioned at one side of the barrier 19, for example the left-hand side, and empty containers 7 are positioned the other side of the barrier 19, for example the right-hand side.

To begin the process, the operator makes an appropriate selection in a process menu of the reader device 25. Each operator may be provided with a unique access code which has to be entered into the reader device 25 and communicated by the reader device 25 to the electronic control unit 21 and matched with access privilege data within the electronic control unit 21. If the operator's access privilege is sufficient to access the station 3, the electronic control unit 21 allows the reader device 25 to read the electronic product ID tag 15 of the containers 7. Each step is recorded within the system 1.

Each station 3 has its own electronic ID tag 27. During set up, the electronic ID tag of each station 3 is associated with predetermined product ID tags 15 of containers 7, so that only specified products can enter the station 3. The electronic control unit 21 stores information on the associated electronic ID tags 27 of the stations 3 and the electronic product ID tags 15 of container 7. The operator scans the electronic product ID tag 15 of the containers 7 and the electronic ID tag 27 of the station 3, and if they match, the system 1 will allow the operator to proceed to the next step, the retrieval of the corresponding tool kit 53 assigned for that particular product from the storage cabinet 5.

The storage cabinet 5 normally stores in its compartments 51 a plurality of tool kits 53 for use within the station 3 for handling said containers 7. Each tool kit 53 is stored in its own compartment 51. The compartments 51 are normally locked. Access to each compartment is allowed or blocked by a respective lock (not shown in the drawings). The locks are controlled by the electronic control unit 21. Each tool kit 53 is matched to a particular product within the system 1. For this purpose, each tool kit 53 has its own electronic ID tag 55 associated with a predetermined product ID tag 15 of a container 7. The electronic ID tag 55 of the tool kit 53 is also associated with a predetermined compartment 51 in the storage cabinet 5. The electronic control unit 21 stores information on the associated electronic ID tags 55 of the tool kits 53, the predetermined compartments 51 in the cabinet 5 and the product ID tags 15 of the containers 15. When the product ID tags 15 of a containers 7 are scanned the electronic control unit 21 matches the scanned product ID tag 15 of the containers 7 with the relevant tool kit 53 in the cabinet 5 and actuates the electronic lock of the compartment 51 containing the matching tool kit 53. The compartment 51 opens and the operator removes the tool kit 53 from the cabinet 5. The remaining compartments 51 remain locked so that no other tool kit 53 can be taken out of the cabinet 5. The now empty compartment 51 will remain empty until the associated tool kit 53 is returned into it. The cabinet 5 also has an electronic ID tag 57 associated with predetermined product ID tags 15 of containers 7. After scanning the product ID tags 15 of the containers 7, the operator has to scan the electronic ID tag 57 of the cabinet 5. The compartment 51 containing the relevant tool kit 53 will only be unlocked if the scanned product ID tags 15 of the containers 7 match the electronic ID tag 57 the cabinet 5. The cabinet 5 may have a touch-screen monitor 59 to allow the operator to interact and control the cabinet 5 in conjunction with the reader device 25.

The system 1 ensures that the retrieved tool kit 53 is used within the correct station 3, making it impossible to use the wrong tool kit 53 in the wrong station 3. Access for the containers 7 into the processing zone 9 is controlled by the barrier 19. The electronic control unit 21 communicates with and controls the actuation of the barrier 19. Only if the operator has the correct tool kit 53 and there is the correct product in the containers 7 will the barrier 19 open to allow access for the containers 7 into the processing zone 9. In practice, the retrieved tool kit 53 has to be brought into the processing zone 9 and "scanned into" the station 3 by scanning the electronic ID tag 55 of the tool kit 53 and an electronic location ID tag 91 in the processing zone 9. The electronic product ID tags 15 of the containers 7 are then scanned again. Once the electronic product ID tags 15 of the containers 7 and the electronic ID tag of the tool kit 53 have been scanned and matched within the electronic control unit 21, the electronic control unit 21 will actuate the barrier 19 to allow the containers 7 to access the processing zone 9. The traffic light 23 at the area entrance to the processing zone changes to green as the barrier 19 opens and the containers 7 are brought into the processing zone 9. Once the containers 7 are brought into the processing zone 9, the operator scans the containers "into" the station 3, by scanning the electronic product ID tags 15 of the containers and electronic location ID tag 91 in the processing zone 9. The barrier 19 closes and the light remains green. The operator then performs the task using the tool kit 53. The task typically involves removing a dip tube from an empty or partially empty container 7 and placing it into a full or partially full container 7. The task may also comprise removing a dip tube from a full or partially full container and inserting it into another full or partially full container. Once the task has been completed, the containers 7 are scanned again. This enables the barrier 19 to open and the operator and the products exit the processing zone 9. Upon exit, the containers are scanned again. This enables the barrier 19 to close.

The traffic light 23 remains green as the station 3 remains in the configured status ready to process the next batch of containers 7 with the same product. Multiple batches of containers 7 with the same product ID tag 15 can be processed in the processing zone using the same tool kit 53.

When product change is required, the tool kit 53 is "scanned out" of the station 3 and is returned into its compartment 51. The traffic light 23 changes to amber and the system 1 awaits to be configured for a new product.

If the operator breaches the workflow process, the station 3 will go into a lock down mode. The traffic light 23 will turn red indicating a lockdown status. A supervisor will be alerted and will commence an investigation. The station 3 will not return into service until the investigation is complete and the integrity of the process and the product have been verified.

It will be appreciated by those skilled in the art that variations and modifications can be made without departing from the scope of the invention as defined in the appended claims.

What is claimed is:

1. A system for handling containers having electronic product ID tags, the system comprising
at least one container handling station;
a storage cabinet with a plurality of lockable compartments for storing tool kits for use within the container handling station for handling said containers; each tool kit having its own electronic ID tag associated with a predetermined compartment in the storage cabinet and with a predetermined product ID tag of a container; wherein access to each compartment is allowed or blocked by a respective electronically controlled lock;
an electronic control unit in communication with the locks, the electronic control unit being operable to control the actuation of the locks and the electronic control unit storing information on the associated electronic ID tags of the tool kits, the predetermined compartments in the cabinet and the product ID tags of containers;
an electronic ID reader device in communication with the electronic control unit, the electronic ID reader device being operable to read electronic ID tags of the components of the system and communicate same to the electronic control unit;
wherein the electronic control unit is operable to actuate the electronic lock of a predetermined compartment in the storage cabinet to allow access to said compartment upon matching the electronic product ID tag of a container communicated to the electronic control unit by the electronic ID reader device through the system with the associated electronic ID tag of the tool kit stored in the predetermined compartment, whilst keeping the remaining compartments locked;
wherein the container handling station has a processing zone with an entrance for containers and an electronically controlled barrier operable to allow or block access to the processing zone via the entrance;
the electronic control unit being in communication with the barrier and operable to control the actuation of the barrier; and the electronic control unit being operable to actuate the barrier to allow the container to access the processing zone once the electronic product ID tag of the container and the electronic ID tag of the tool kit retrieved from the storage cabinet have been read and communicated by the reader device to the electronic control unit and matched within the electronic control unit.

2. A system of claim 1, wherein the storage cabinet has an electronic ID tag associated with said predetermined product ID tag of the container, wherein the electronic control unit is additionally operable to actuate the electronic lock of said predetermined compartment in the storage cabinet upon matching the previously communicated product ID tag of the container with the electronic ID tag of the cabinet communicated to the electronic control unit by the electronic ID reader device.

3. A system of claim 1, wherein the electronic control unit is additionally operable to actuate the barrier to allow the container to access the processing zone after the tool kit has been retrieved from the predetermined compartment, transferred to the processing zone and an electronic location ID tag in the processing zone and the electronic ID tag of the tool kit have been read by the reader device and communicated to the electronic control unit and matched within the electronic control unit.

4. A system of claim 1, wherein the system has a plurality of said container handling stations, each container handling station having its own electronic ID tag, the electronic ID tag of each container handling station being associated with a predetermined electronic product ID tag of a container; and the electronic control unit is operable to store information on the associated electronic ID tags of the container handling stations and the electronic product ID tags of container; wherein the electronic control unit is additionally operable to permit a predetermined compartment in the storage cabinet to open once the electronic ID tag of the container handling station to be accessed and the electronic product ID tag of container to be handled within that station have been read and communicated by the reader device to the electronic control unit and matched within the electronic control unit.

5. A system of claim 1, wherein the electronic control unit is operable to allow the reader device to read the electronic product ID tag of a container once an operator ID has been communicated by the reader device to the electronic control unit and matched with access privilege data within the electronic control unit.

6. A system of claim 1, wherein the handling of containers in the processing zone comprises dip tube exchange between at least two containers or at least one container, e.g. where new dip tubes are introduced.

7. A system of claim 1, wherein the processing zone is a controlled environment zone.

8. A method for handling containers having electronic product ID tags, the method comprising the steps of:
   a) providing:
   at least one container handling station;
   a storage cabinet with a plurality of lockable compartments for storing tool kits for use within the container handling station for handling said containers; each tool kit having its own electronic ID tag associated with a predetermined compartment in the storage cabinet and with a predetermined product ID tag of a container; wherein access to each compartment is allowed or blocked by a respective electronically controlled lock;
   an electronic control unit in communication with the locks, the electronic control unit being operable to control the actuation of the locks and the electronic control unit storing information on the associated electronic ID tags of the tool kits, the predetermined compartments in the cabinet and the product ID tags of containers;
   an electronic ID reader device in communication with the electronic control unit, the electronic ID reader device being operable to read electronic ID tags of the components of the system and communicate same to the electronic control unit;
   wherein the container handling station has a processing zone with an entrance for containers and an electronically controlled barrier operable to allow or block access to the processing zone via the entrance; the electronic control unit being in communication with the barrier and operable to control the actuation of the barrier;
   b) reading, by means of the electronic ID reader device, the electronic product ID tag of a container and communicating read data to the electronic control unit; and c) actuating, by means of the electronic control unit, the electronic lock of a predetermined compartment in the storage cabinet to allow access to said compartment upon matching the electronic product ID tag of a container communicated to the electronic control unit by the electronic ID reader device with the associated electronic ID tag of the tool kit stored in the predetermined compartment, whilst keeping the remaining compartments locked;
   d) reading and communicating, by means of the reader device, to the electronic control unit the electronic product ID tag of the container and the electronic ID tag of the tool kit retrieved from the storage cabinet;
   e) matching the electronic product ID tag of the container and the electronic ID tag of the tool kit within the electronic control unit; and
   f) actuating, by means of the electronic control unit, the barrier to allow the container to access the processing zone.

9. A method of claim 8, wherein the storage cabinet has an electronic ID tag associated with said predetermined product ID tag of the container, wherein the method includes the step of matching, by means of the electronic control unit, the previously communicated product ID tag of the container with the electronic ID tag of the cabinet communicated to the electronic control unit by the electronic ID reader device prior to allowing the actuation of the electronic lock of said predetermined compartment in the storage cabinet.

10. A method of claim 8, wherein prior to actuating the barrier, the method comprises the step of retrieving the tool kit from the predetermined compartment, transferring to the processing zone and reading by the reader device an electronic location ID tag in the processing zone and the electronic ID tag of the tool kit and communicating same to the electronic control unit and matching same within the electronic control unit.

11. A method of claim 8, wherein the system has a plurality of said container handling stations, each container handling station having its own electronic ID tag, the electronic ID tag of each container handling station being associated with a predetermined electronic product ID tag of a container; and the electronic control unit is operable to store information on the associated electronic ID tags of the container handling stations and the electronic product ID tags of container; wherein the method comprises the step of prior to permitting the predetermined compartment in the storage cabinet to open, reading by the reader device the electronic ID tag of the container handling station to be accessed and the electronic product ID tag of container to be handled within that station and communicating same to the electronic control unit and matching same within the electronic control unit.

* * * * *